United States Patent

Koga

Patent Number: 5,477,727
Date of Patent: Dec. 26, 1995

[54] CAPACITIVE LEVEL SENSOR

[75] Inventor: Sadamichi Koga, Ome, Japan

[73] Assignee: Japan Aviation Electronics Industry Limited, Tokyo, Japan

[21] Appl. No.: 185,792

[22] PCT Filed: May 24, 1993

[86] PCT No.: PCT/JP93/00683

§ 371 Date: Jan. 24, 1994

§ 102(e) Date: Jan. 24, 1994

[30] Foreign Application Priority Data

May 25, 1992 [JP] Japan .................. 4-132609

[51] Int. Cl.⁶ .................. G01F 23/26; H01G 5/00
[52] U.S. Cl. .................. 73/304 C; 361/284
[58] Field of Search .................. 73/304 C; 361/284; 324/663, 690

[56] References Cited

U.S. PATENT DOCUMENTS

| | | | |
|---|---|---|---|
| Re. 24,082 | 11/1955 | Smith | 361/284 |
| 4,924,702 | 5/1990 | Park | 73/304 C |
| 5,103,368 | 4/1992 | Hart | 361/284 |
| 5,144,835 | 9/1992 | McDonald | 73/304 C |

FOREIGN PATENT DOCUMENTS

| | | | |
|---|---|---|---|
| 79016 | 4/1988 | Japan . | |
| 157018 | 6/1988 | Japan . | |
| 75917 | 3/1989 | Japan | 73/304 C |
| 258725 | 9/1992 | Japan | 73/304 C |
| 147955 | 5/1994 | Japan | 73/304 C |
| 1538055 | 1/1990 | U.S.S.R. | 73/304 C |

*Primary Examiner*—William A. Cuchlinski, Jr.
*Assistant Examiner*—Willie Morris Worth
*Attorney, Agent, or Firm*—Pollock, Vande Sande & Priddy

[57] ABSTRACT

A main sensor electrode part 3 and a reference sensor electrode part 4 are deposited in patterns over the surface of a support member 10. A lead-out part 4b of the reference sensor electrode part 4 is extended through an unplated passage 11 of the main sensor electrode part 3 to the upper edge of the support member 10 to form there a terminal part 4a. A portion of the main sensor electrode part 3 is also extended to the upper edge of the support member 10 to form there a terminal part 3a. The support member 10 is deposited all over its surface with an insulating film 12 covering the both sensor electrode parts 3 and 4.

5 Claims, 2 Drawing Sheets

CAPACITIVE LEVEL SENSOR

TECHNICAL FIELD

The present invention relates to a capacitive level sensor which is suitable for use with a tank for a nonconductive liquid or a tank for a conductive liquid (of low electrical resistance) such as water.

As shown in FIG. 1, a conventional capacitive level sensor of this kind is composed of a pair of opposed electrodes, that is, an outer tube 1 made of metal (referred to also as a common electrode) and an inner tube 2 made of metal and disposed concentrically therewith, and the inner tube 2 is made up to a main sensor electrode part 3 and a reference sensor electrode part 4. The main sensor electrode part 3 and the reference sensor electrode part 4 have the same radius and are mechanically secured to the outer tube 1 by support members 5 made of an insulating material. Cables 6 and 7 are connected to the main sensor electrode part 3 and the reference sensor electrode part 4, respectively.

Such a level sensor is disposed with the reference sensor electrode part 4 positioned at the bottom of a tank on the inside thereof, whereby the height of the liquid level H or liquid level h in the range from the lower and to the upper end of the main sensor electrode part 3 can be detected. When oil or similar liquid enters the space defined between the outer tube or common electrode 1 and the inner tube 2, the electrostatic capacitance between the main sensor electrode part 3 and the common electrode 1 changes in proportion to the liquid level h. Letting the length of the main sensor electrode part 3 in its axial direction (in the vertical direction) be represented by L, the electrostatic capacitance between the main sensor electrode part 3 and the common electrode 1 when the liquid level is h (which electrostatic capacitance will be referred to simply as the electrostatic capacitance of the main sensor electrode part) by Csh, the electrostatic capacitance when the space between the main sensor electrode part 3 and the common electrode 1 is filled with air (that is, when h= 0) by Cso and the specific inductivity of the liquid by $\epsilon$, the following equation holds true:

$$Csh= Cso(L-h)/L+\epsilon Csoh/L.$$

Therefore, the liquid level h is given by $$h= L(Csh-Cso)/\{Cso(\epsilon-1)\}.$$

The specific inductivity of the liquid is given by $\epsilon= Cr/Cra$, where Cra is the electrostatic capacitance when the space between the reference sensor electrode part 4 and the common electrode 1 is filled with air and Cr is the electrostatic capacitance when the space between the reference sensor electrode part 4 and the common electrode 1 is filled with the liquid. Cso and Cra are both constants that depend on the sizes and constructions of the main sensor electrode part 3 and the reference sensor electrode part 4. The specific inductivity e can be preobtained by premeasuring the electrostatic capacitance Cra of the reference sensor electrode part 4 in the state of no liquid being filled in the tank and the electrostatic capacitance Cr in the state of the reference sensor electrode part 4 being submerged in the liquid. The height h of the liquid level H can be obtained by measuring the electrostatic capacitance Csh of the main sensor electrode part 3 by means of an instrument not shown.

Since such a capacitive level sensor requires, as the tubular electrode 2, the two electrically insulated sensor electrode parts 3 and 4, it is necessary in the prior art to fix these sensor electrode parts 3 and 4 to the outer tube 1 through the support members 5; thus, the conventional level sensor has disadvantages of requiring many support members 5 and involving work of securing the sensor electrode parts to the outer tube through the support members. Another problem is the use of the cables 6 and 7 that are connected to the sensor electrode parts 3 and 4, respectively.

An object of the present invention is to provide a capacitive level sensor which overcomes these problems and, though simple-structured, ensures the same performance as is obtainable with the prior art.

DISCLOSURE OF THE INVENTION

To solve the above-mentioned problems, according to the present invention, in a capacitive level sensor of type that has first and second electrode means disposed opposite each other with a space defined therebetween which can be filled with liquid whose level is to be measured and the first electrode means is made up of a main sensor-electrode part and a reference sensor electrode part, the first electrode means comprises: support means disposed opposite and spaced apart from the second electrode means and having at least one surface; the main sensor electrode part and the reference sensor electrode part deposited by electroless plating or printing over the said surface of the support means, the main and reference sensor electrode parts being spaced apart in the vertical direction; an insulating film deposited all over the said surface and covering the main sensor electrode part and the reference sensor electrode part; a terminal part formed by extending one part of the main sensor electrode part to the upper edge of the support means; and a lead-out part of the reference sensor extended up to the upper electrode part extended through a vertical unplated passage in the main sensor electrode part up to the upper edge of the support member to form a terminal part at the upper end.

The construction mentioned above permits pattern plating or printing of the main sensor electrode part and the reference sensor electrode part and precludes the necessity of the cables of the sensor electrode parts 3 and 4 needed in the prior art, and hence provides level sensors of this kind with ease and at low cost.

BEST MODE FOR CARRYING OUT THE INVENTION

Figure 1:
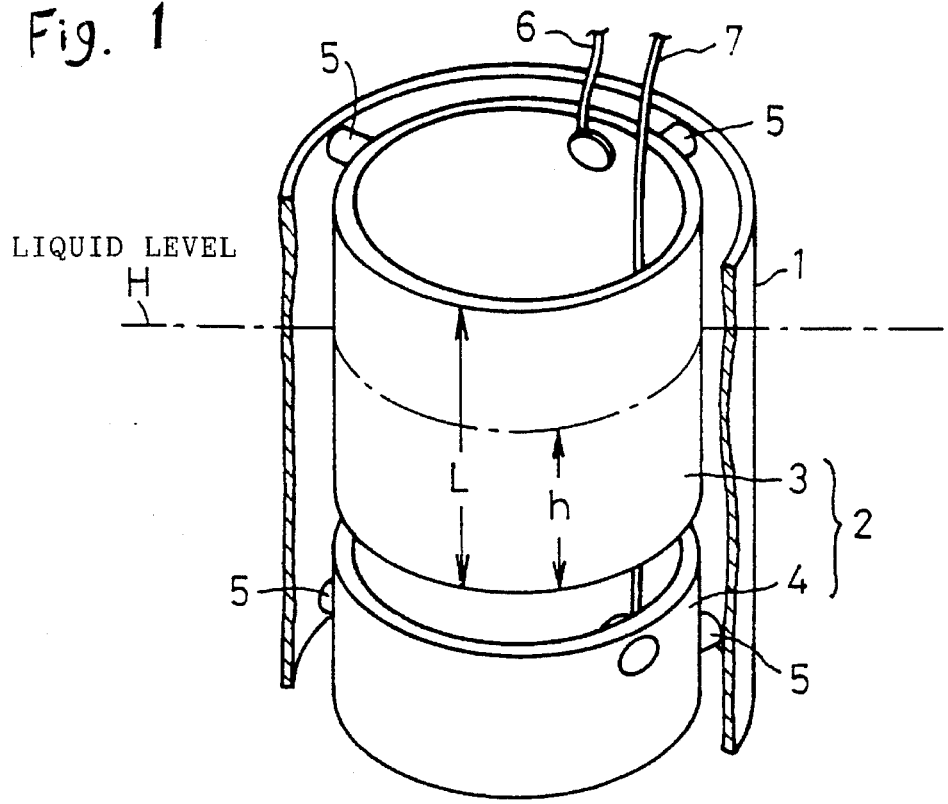
FIG. 1 is a perspective view, partly cut away, showing an example of a conventional capacitive level sensor.

A description will be given, with reference to FIG. 2, of an embodiment of the capacitive level sensor according to the present invention. The parts corresponding to those in FIG. 1 are identified by the same reference numerals and no description will be given of them. In this embodiment, a cylindrical support member 10 made of an insulating material such as epoxy resin is disposed upright, and the main sensor electrode part 3 and the reference sensor electrode 4 described previously in respect of FIG. 1 are deposited on the outer peripheral surface of the cylindrical support but spaced apart in the vertical direction (i.e. in the axial direction of the support member.) These sensor electrode parts 3 and 4 can be formed by depositing a conductive material through use of a known electroless plating or printing method.

A part of the main sensor electrode part 3 is removed axially thereof to form an unplated passage 11 and a part of the upper edge of the reference sensor electrode 4 is extended up to form a lead-out portion 4b, which is further extended through the unplated passage 11 up to the upper edge of the support 10 to form there a terminal part 4a. A part of the upper marginal edge of the main sensor electrode part 3 is also extended to the upper edge of the support member 10 to form a terminal part 3a. The support member 10 is coated all over its outer peripheral surface with an insulating film 12 covering both sensor electrode parts 3 and 4. The insulating film 12 can be formed by coating or painting a resin material. In this way, the inner tube 2 is constructed.

Figure 2:
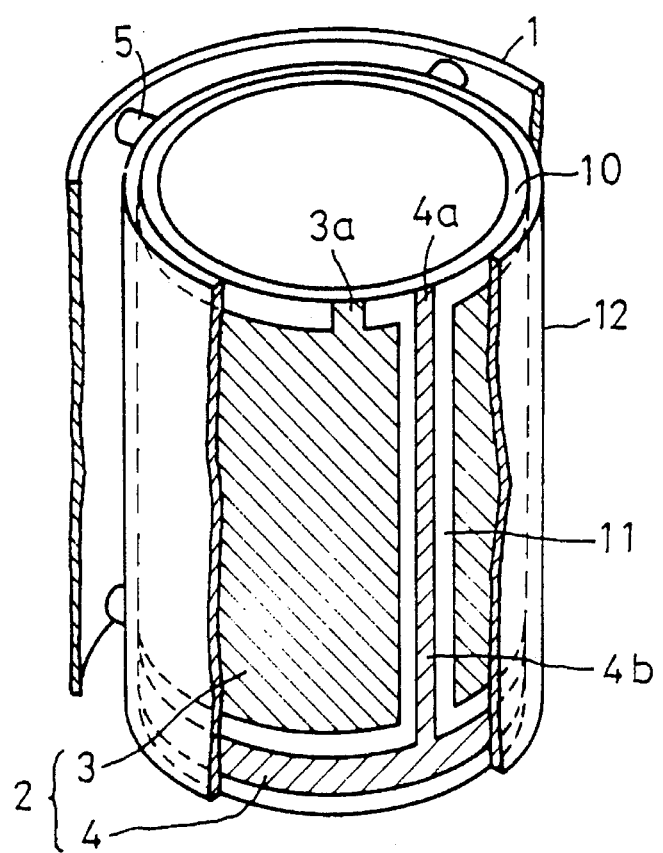
FIG. 2 is a perspective view, partly cut away, illustrating an example of the capacitive level sensor according to the present invention.

With the construction shown in FIG. 2, the main sensor electrode part 3 and the reference sensor electrode part 4 can simultaneously be deposited by electroless plating or printing on the surface of the support member 10 made of an insulating material and the inner tube 2 can be completed by depositing the insulating film 12 through mere painting. Since the main sensor electrode part 3 and the reference sensor electrode part 4 forming the inner tube 2 are formed on the common cylindrical support member 10, the number of support members 5 for securing the inner tube 2 to the outer tube 1 can also be made smaller than in the prior art example of FIG. 1, facilitating the work.

Figure 3:
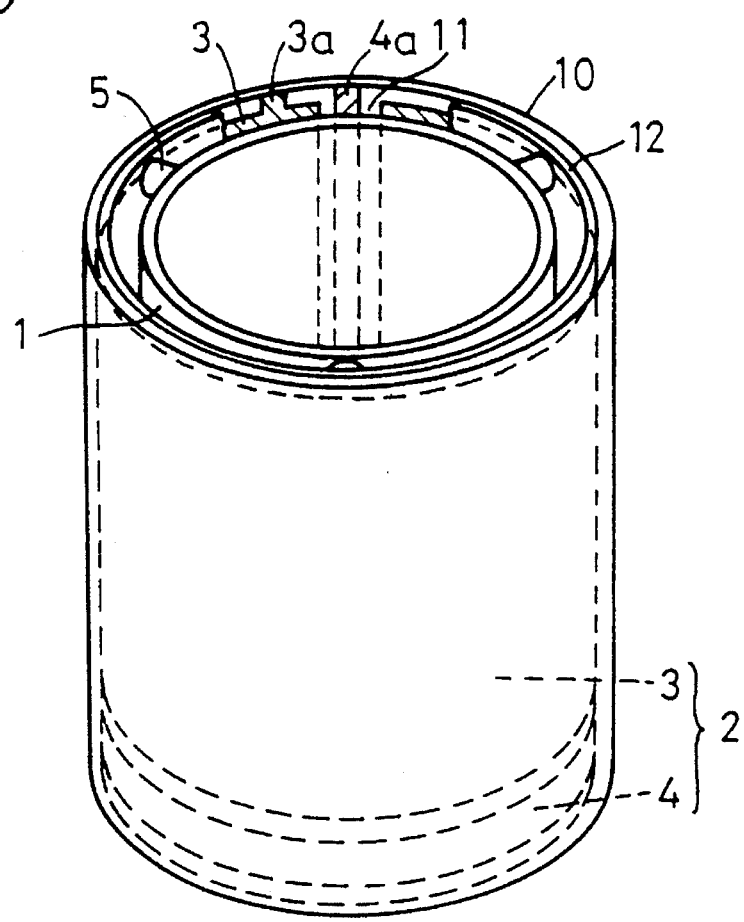
FIG. 3 is a perspective view illustrating a modified form of the FIG. 2 embodiment.

While in the FIG. 2 embodiment the main sensor electrode part 3 and the reference sensor electrode part 4 are formed over the outer peripheral surface of the cylindrical support member 10, they can also be formed over its inner peripheral surface and it is apparent that the same effect could be obtained in such a case. Alternatively, the tubular common electrode 1 may be disposed inside of the inner tube 2, and such a construction is shown in FIG. 3 but no description will be repeated.

Figure 4:
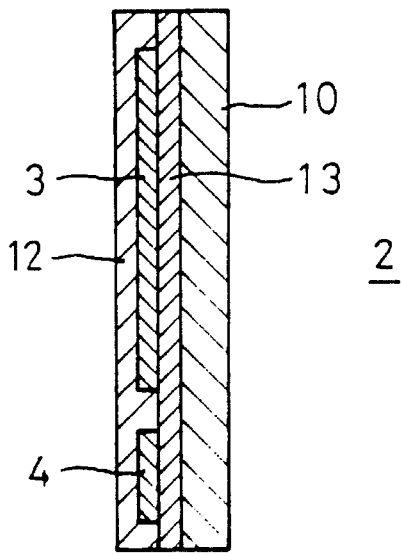
FIG. 4 is a sectional view of a part of another embodiment according to the present invention.

In the case where the support member 10 is made of conductive material such as a metal plate, an insulator 13 is deposited over the surface of the support member 10, and the afore-mentioned sensor electrode parts 3 and 4 are deposited over the insulator surface as depicted in FIG. 4. In this instance, those portions of the support member where the terminal parts 3a and 4a are formed are also covered with the insulator. The illustrated inner tube shown in FIG. 4 is identical in construction with that in the FIG. 2 embodiment except the above. Such an inner tube 2 is secured by support members to the inside of the outer tube (the common electrode) 1 described previously with reference to FIG. 1. Although in the above the common electrode and the sensor electrode part are described to be formed by the outer tube 1 and the inner tube 2, the individual electrodes may also be flat electrodes disposed opposite each other.

As described above, according to the capacitive level sensor of the present invention, the main sensor electrode part 3 and the reference sensor electrode part 4 of the conventional inner tube (i.e. the sensor electrode part) are deposited in desired patterns; hence, the inner tube 2 can be fabricated with ease. Moreover, the reference sensor electrode part 4 has the lead-out part 4b, which is extended through the unplated passage 11 of the main sensor electrode part 3 to the upper edge of the support member 10 to form there the terminal part 4a, and the lead-out part and the terminal part can be formed at the same time that the main sensor electrode part 3 and the reference sensor electrode part 4 are formed by deposition—this precludes the necessity of using cables, and hence reduces the manufacturing costs of the device. Besides, since the patterns (the sensor electrode parts 3 and 4) are covered with the insulating film 12, the level sensor of the present invention can be used regardless of whether the liquid to be measured is conductive or not.

I claim:

1. A capacitive level sensor which has first and second electrodes disposed opposite each other with a space therebetween said to define a capacitor whose capacitance is representative of the height of a liquid that is filled into the space between said first and second electrodes, said first electrode being made up of a main sensor electrode part and a reference sensor electrode part, said first electrode comprising:

support means for supporting said main and reference sensor electrode parts, said support means being disposed opposite to and spaced apart from said second electrode and having at least one surface;

said main sensor electrode part and said reference sensor electrode part being deposits of electroless plating or printing on said surface of said support means, said main and reference sensor electrode parts being spaced apart in the vertical direction;

an insulating film deposited over said surface and covering said main sensor electrode part and said reference sensor electrode part;

a terminal formed by extending one portion of said main sensor electrode part to an upper edge of said support means; and a lead-out of said reference sensor electrode part extended through a vertical unplated portion of said main sensor electrode part to the upper edge of said support means to form there a terminal part.

2. The capacitive level sensor of claim 1, wherein said first and second electrodes are cylindrical in shape and the first electrode is disposed inside of the second electrode.

3. The capacitive level sensor of claim 1, wherein said first and second electrodes are cylindrical in shape and the first electrode is disposed outside of the latter.

4. The capacitive level sensor of claim 1, 2, or 3, wherein said support means is made of an insulating material.

5. The capacitive level sensor of claim 1, 2, or 3, wherein said support means is made of metal.

* * * * *